United States Patent
Beall et al.

(12) 
(10) Patent No.: US 6,736,012 B1
(45) Date of Patent: May 18, 2004

(54) SAFETY DEVICE FOR USE AS OVERPRESSURE PROTECTION FOR A TRAPPED VOLUME SPACE

(75) Inventors: Scott Kennedy Beall, Houston, TX (US); Lorents Reinas, Houston, TX (US)

(73) Assignees: Aker Kvaerner Oilfield Products, Inc., Houston, TX (US); Statoil ASA, Lysaker (NO)

( * ) Notice: Subject to any disclaimer, the term of this patent is extended or adjusted under 35 U.S.C. 154(b) by 0 days.

(21) Appl. No.: 10/408,717

(22) Filed: Apr. 7, 2003

(51) Int. Cl.⁷ .................................................. G01L 7/00
(52) U.S. Cl. ......................................................... 73/709
(58) Field of Search ........................ 73/1.57, 709, 756; 137/861, 884, 484.6

(56) References Cited

U.S. PATENT DOCUMENTS

| | | | | |
|---|---|---|---|---|
| 4,082,147 A | * | 4/1978 | Wolff et al. .................. 166/375 |
| 4,138,669 A | * | 2/1979 | Edison et al. ............... 340/3.51 |
| 5,139,225 A | * | 8/1992 | Olson et al. ................ 251/61.2 |
| 5,884,706 A | | 3/1999 | Edwards ...................... 166/335 |

OTHER PUBLICATIONS

*Harts E&P*, "Special Meritorious Award for Engineering Innovation—Microspheres Protect High–Pressure Wells" Apr. 2003, p. 106.

* cited by examiner

Primary Examiner—William Oen
(74) Attorney, Agent, or Firm—Wendy Buskop; Buskop Law Group, P.C.

(57) ABSTRACT

The invention is a safety device for a trapped volume space for use as overpressure protection made of a housing forming a chamber within a trapped volume space having a incompressible fluid, a compressible material disposed in the chamber, and a pressure relief component in communication with the compressible material and the incompressible fluid, wherein the pressure relief component is adapted to break at a predetermined point thereby increasing the trapped volume space by compressing the compressible material and resulting in a reduced pressure in the trapped volume space.

34 Claims, 8 Drawing Sheets

SAFETY DEVICE FOR USE AS OVERPRESSURE PROTECTION FOR A TRAPPED VOLUME SPACE

FIELD OF THE INVENTION

The invention relates to a safety device to prevent overpressure situations of trapped volume spaces filled with incompressible fluids.

BACKGROUND OF THE INVENTION

When incompressible fluids in a closed volume, like a vessel or pipe, are subjected to high temperatures, the effects are dangerous. The fluid expands more rapidly than the surrounding metal of the pressure vessel or pipe and causes an overstress situation.

Typically, a person must handle this type of overstressing situation by manually opening or closing valves in order to reduce or add the volume of the displace fluid. The task is dangerous since an error by the worker would likely cause a rupture of high temperature, high pressure fluids.

A need exists for a reliable system in which a person is not required to correct the overstress manually.

SUMMARY OF THE INVENTION

The invention is a safety device for a trapped volume space for use as overpressure protection. The invention is a housing forming a chamber within a trapped volume space having a incompressible fluid, a compressible material disposed in the chamber, and a pressure relief component in communication with the compressible material and the incompressible fluid. The pressure relief component is adapted to break at a predetermined point thereby increasing the trapped volume space by compressing the compressible material and resulting in a reduced pressure in the trapped volume space.

The invention is also a pressure relief device for a subsea Christmas tree.

The invention is a method for preventing overpressure situations in a trapped volume space. The method begins by disposing the pressure device in a trapped volume space for use as overpressure protection. The method ends by engaging the pressure relief component when the pressure of the incompressible fluid reaches a set pressure limit and reducing the pressure of the incompressible fluid by permitting the incompressible fluid to commingle with the compressible material.

BRIEF DESCRIPTION OF THE DRAWINGS

A specific embodiment of the invention will be described by way of example with reference to the accompanying drawings, in which.

DESCRIPTION OF THE PREFERRED EMBODIMENTS

Figure 1:
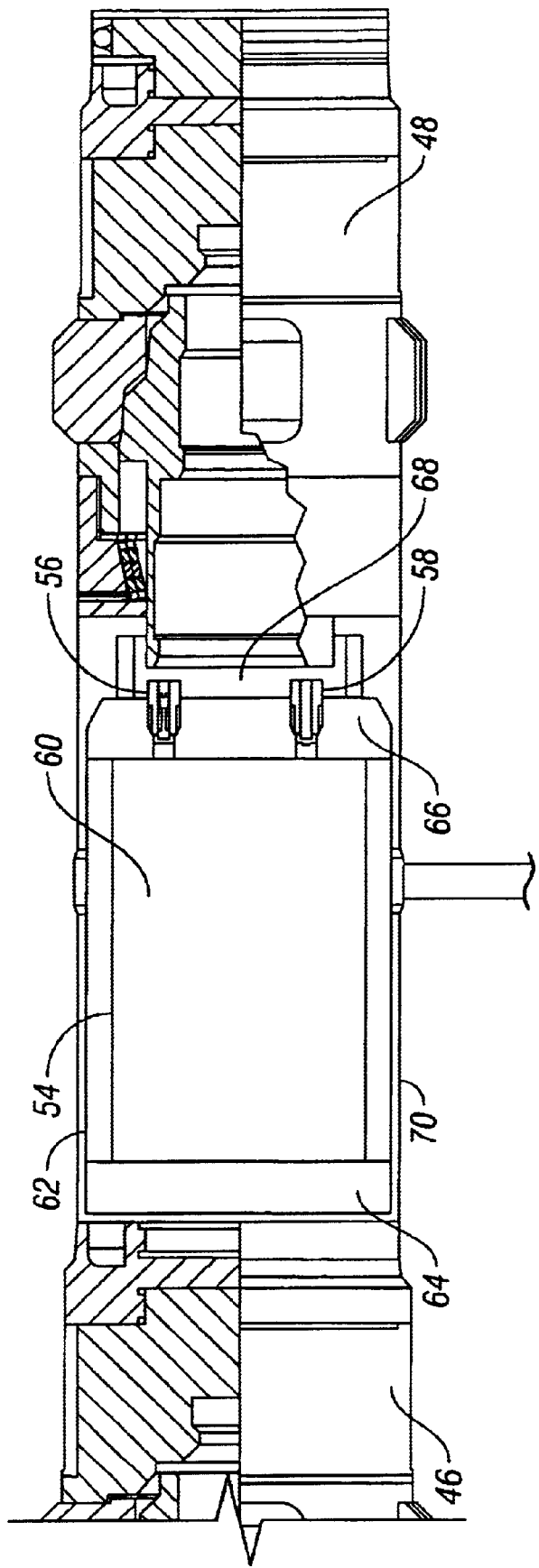
FIG. 1 shows a side view of the invention located in a subsea Christmas tree.

Before explaining the present invention in detail, it is to be understood that the invention is not limited to the particular embodiments and that it can be practiced or carried out in various ways.

The safety device for a trapped volume space for use as overpressure protection.

The expansion of incompressible fluid in a trapped volume space occurs when an incompressible fluid is subjected to high temperatures. The fluid tries to expand more than the surrounding metal pressure vessel can expand and cause an overstress situation.

The device is filled with a compressible material for example, an inert gas or foam. When the pressure of the incompressible fluid in the trapped volume space becomes two high, a pressure relief component located on the device ruptures. Since the inert gas is compressible, the overpressured incompressible fluid has a volume in which it can expand, therefore, reducing the overall pressure of the incompressible fluid in the trapped volume space.

The invention advantageously is a device which can be placed in a trapped volume space for later use. The time delay, the ability of a user to have the advantage of this device at a time later then the time of installation of the device is important. This time delay feature is a significant advantage over the known art.

In the preferred embodiment, the invention is a safety device for a trapped volume space for use as overpressure protection. The safety device has housing 62. The housing has a top housing 64 and a bottom housing 66 that together forms a chamber 54 within the housing. The housing 62 itself is located within a trapped volume space surrounded by an incompressible fluid 68, such as any number of incompressible fluid, such as water and is comprised of a rigid material adapted to withstand an incompressible fluid pressure equivalent to at least 10 feet water depth.

The invention also has a compressible material disposed in the chamber 54. The compressible material can be an inert gas or a foam. Further, the chamber can also include bellows, a bladder, an accumulator, and combinations of these. It is contemplated that the accumulator is a pneumatic compensator, a hydraulic compensator, or a mechanical compensator. Examples of the inert gas that can be used are nitrogen, air, helium, and combinations thereof.

The invention has a pressure relief component 58 which can be a rupture disk or an imploding container. The rupture disk or pressure relief component can in one embodiment, be located in the bottom of the housing.

The pressure relief valve is in communication with the compressible fluid. In one embodiment, it is in the walls of the housing providing communication between the compressible and incompressible materials. The pressure relief component is in communication with the compressible material 60 and the incompressible fluid 68, wherein the pressure relief component is adapted to break at a predetermined point thereby increasing the trapped volume space by compressing the compressible material and resulting in a reduced pressure in the trapped volume space.

The pressure relief component 58 is an imploding container or a rupture disk. The imploding container can be constructed of ceramic, porcelain, glass, metal, an elastomer, rubber, synthetic rubber, polymer, copolymers thereof, laminates thereof, composites thereof, or a combination thereof. The imploding container and rupture disk are adapted to break and allow the compressible material within the chamber to commingle with the incompressible fluid.

The pressure relief component is an irreversible use component adapted to activate or burst or break at a predetermined point. The predetermined point is a set pressure limit for the trapped volume space.

The invention can optionally include a charging fitting 56 located in communication with the chamber, such as in the wall at the bottom housing 66 to pressurize the compressible material in the chamber. The charging fitting 56 can be a one-way valve, a check valve, and a needle valve.

The invention is a method for preventing overpressure situations in a trapped volume space using the safety device described herein. The method begins by disposing the safety device in a trapped volume space for use as overpressure protection. The method ends by engaging the pressure relief component when the pressure of the incompressible fluid 68 reaches a set pressure limit and thereby increasing the trapped volume space by compressing the compressible material and resulting in a reduced the pressure of the incompressible fluid 68 in the trapped volume space. The pressure relief component permits the incompressible fluid to commingle with the compressible material.

The method can further include a step of using a charging fitting on the housing to pressure the compressible material. Another alternative for the method includes using a rupture disc or an imploding container as the pressure relief component.

The invention is also a system for preventing overpressure situations in a trapped volume space. The system is a subsea Christmas tree, a trapped volume space containing a incompressible fluid located within the subsea Christmas tree, and the pressure relief device disposed within the trapped volume space.

FIG. 1 is a side view of the invention located in a subsea Christmas tree. FIG. 1 shows the housing 62 located within the subsea Christmas tree. The invention is surrounded by an incompressible fluid 68 inside of the subsea Christmas tree. The housing 62 forms a chamber 54. The compressible material 60 is located within the chamber 54.

The housing 62 has a top housing 64 and a bottom housing 66 as shown in FIG. 1. It is contemplated that the housing can be a one part structure or a multiple part structure. His figure shows an upper tubing hanger plug 46 and a lower tubing hanger plug 48.

A charging fitting 56 can be located in the wall of the housing. The charging fitting is in communication between the incompressible fluid and the compressible material and a rupture disk 58. Other pressure relief components can be used within the scope of the invention include an imploding container. The charging fitting 56 is used to pressurize the compressible material 60 within the chamber 54 before the device is located within the subsea Christmas tree. This charging fitting is optional, as the housing can be non-pressurized.

The rupture disk 58 activates, such as by breaking, when the pressure of the incompressible fluid 68 is above a predetermined point allowing the incompressible fluid 68 to flow into the chamber 54 and co-mingle with the compressible material 60. The trapped volume space 70 which contains the incompressible fluid is also shown.

The invention is also a pressure relief device for a subsea Christmas tree.

Figure 2:
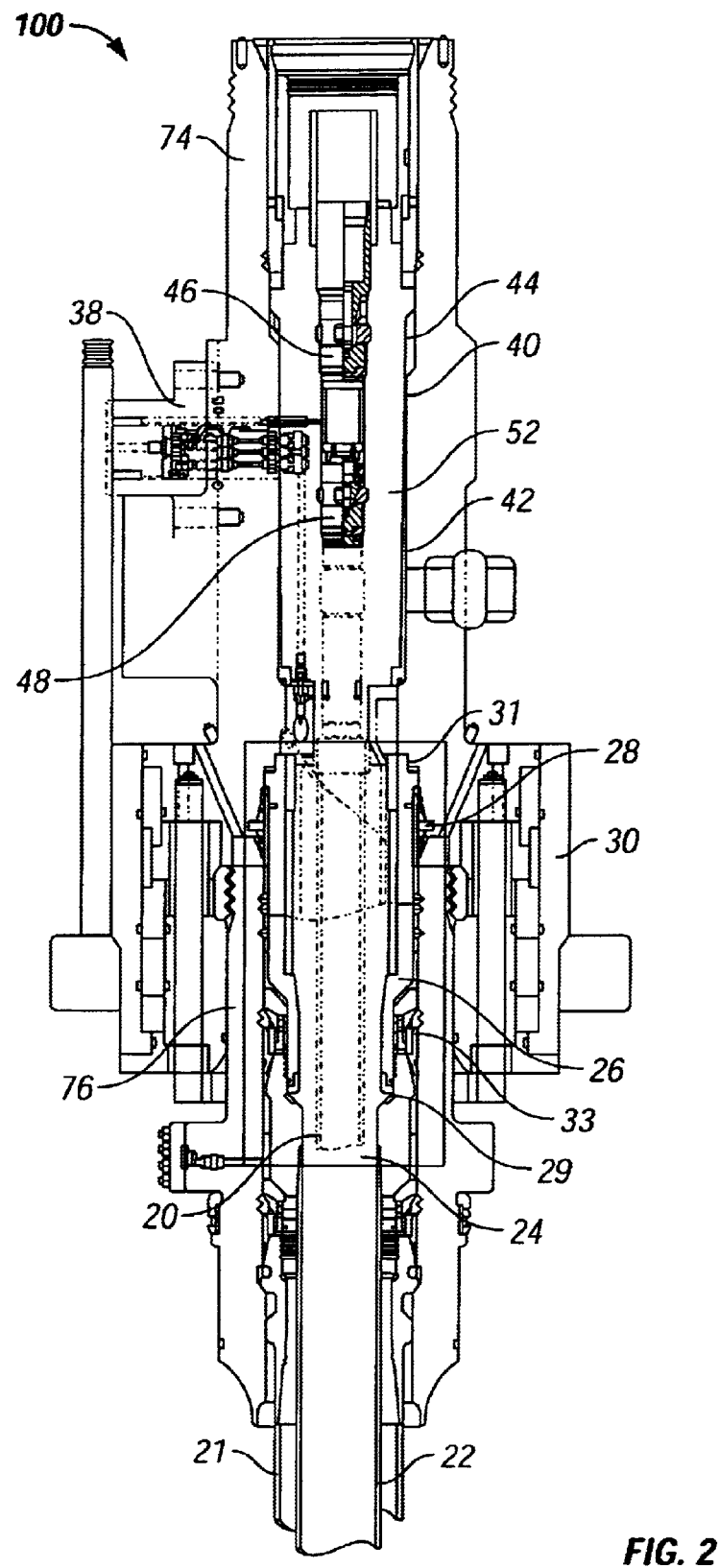
FIG. 2 shows a side view of a subsea Christmas tree.

FIG. 2 is a side view of a typical subsea Christmas tree 100. FIG. 2 shows the production string 20 has an outer casing 21 located within inner casing 22. The space surrounding the production string 20 is the production annulus 24. FIG. 2 also shows the relationship of the tree isolation sleeve 26, first seal 28, second seal 29, and third seal 31, and fourth seal 33 and tree connector 30 to the production string 20 and the inner casing 22.

The tubing hanger 52 is sealed on the outside to the tree spool by the fifth seal 40, the sixth seal 42, and the seventh seal 44. The tubing hanger 52 is sealed on the inside to the wire line plug by the upper tubing hanger plug 46 and lower tubing hanger plug 48.

FIG. 2 also shows the penetrator 38 in relation to the production string 20. Finally, the top side of the subsea Christmas tree 100 includes the tree stalk 74. The wellhead 76 is also shown in this embodiment.

In the preferred embodiment, the safety device is useable in any trapped volume space. For example, in a subsea Christmas tree, there are numerous trapped volume spaces where the use of the safety device is applicable.

Figure 3:
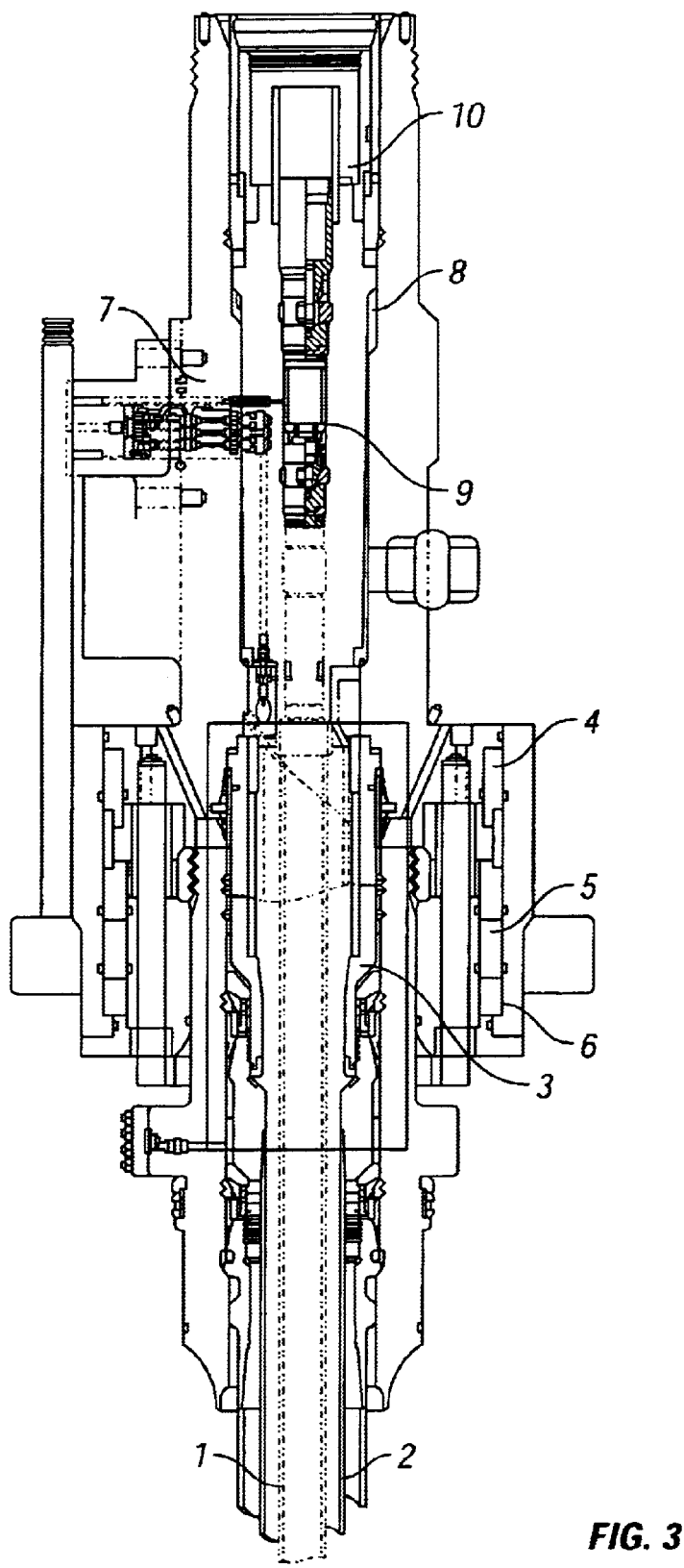
FIG. 3 shows another side view of a subsea Christmas tree showing possible trapped volume spaces.

FIG. 3 shows ten possible trapped volume spaces in a subsea Christmas tree which can contain this invention. The identified trapped volume spaces in FIG. 3 are a. production annulus 1 is an area between the production string 20 and the inner casing 22;

b. casing annulus 2 is an area between the inner casing 22 and the outer 21;

c. the isolation sleeve area 3 is an area between the tree isolation sleeve 26 and first seal 28, second seal 29, third seal 32, and fourth seal 33 and the wellhead 76;

d. the locking area 4 is a first volume between the tree connector 30 and the tree stalk 74;

e. the unlocking area 5 is a second volume between the tree connector 30 and the tree stalk 74;

f. the secondary unlocking area 6 is a third volume between the tree connector 30 and the tree stalk 74;

g. a penetrator area 7 an area between the penetrator 38 and the tree stalk 74 and the tubing hanger 52 and fifth seal 40 and sixth seal 42;

h. the tubing hanger unlock area 8 is an area between the fifth seal 40 and the seventh seal 44;

i. the tubing 9 is an area between the upper tubing hanger plug 46 and lower tubing hanger plug 48 and the tubing hanger 52; and j. the debris cap area 10 is an area between upper tubing hanger plug 46, the debris cap 50 and the tubing hanger 52 and tree stalk 74.

Figure 4:
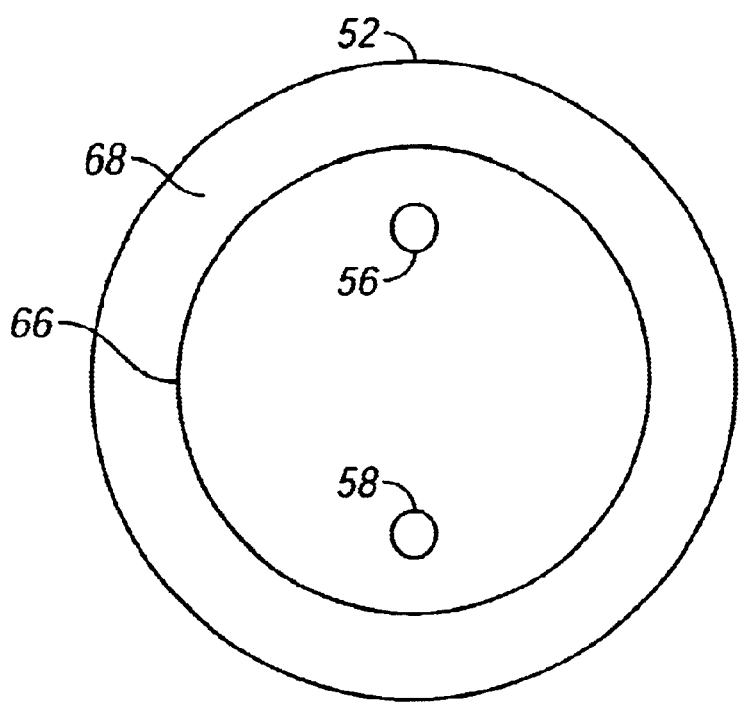
FIG. 4 shows a bottom view of the invention.

FIG. 4 shows a bottom view of one embodiment of the invention. In particular, FIG. 4 shows the charging fitting 56 and the rupture disk 58 disposed within the bottom housing 66. FIG. 4 also shows the relationship of the rupture disk 58 to the incompressible fluid 68 and the tubing hanger 52 and the trapped volume space.

Figure 5:
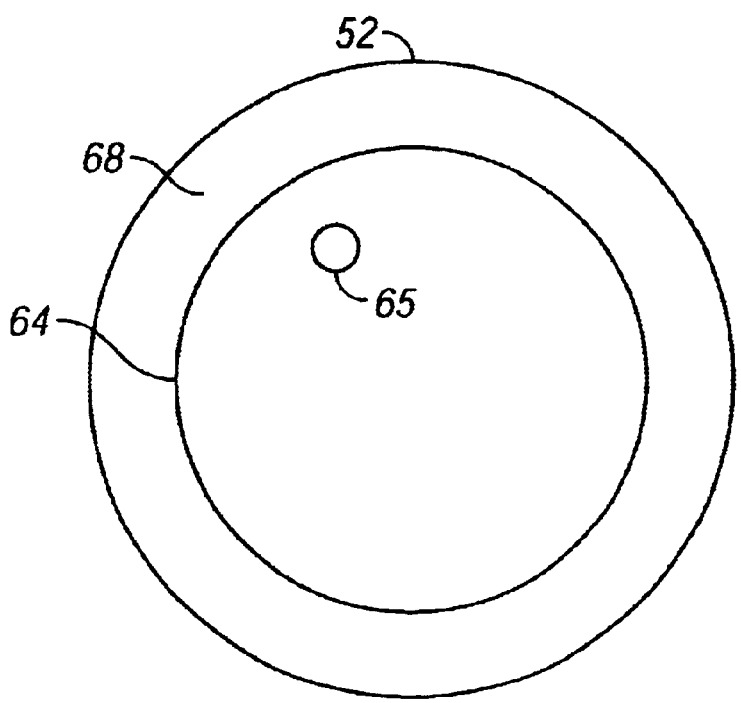
FIG. 5 shows a top view of the invention.

FIG. 5 is a top view of the invention showing the top housing 64 containing the incompressible fluid 68 in the subsea Christmas tree. The top housing 64 can have a threaded engagement 65 for connecting to a portion of the subsea Christmas tree or other portion of a trapped volume space.

Figure 6:
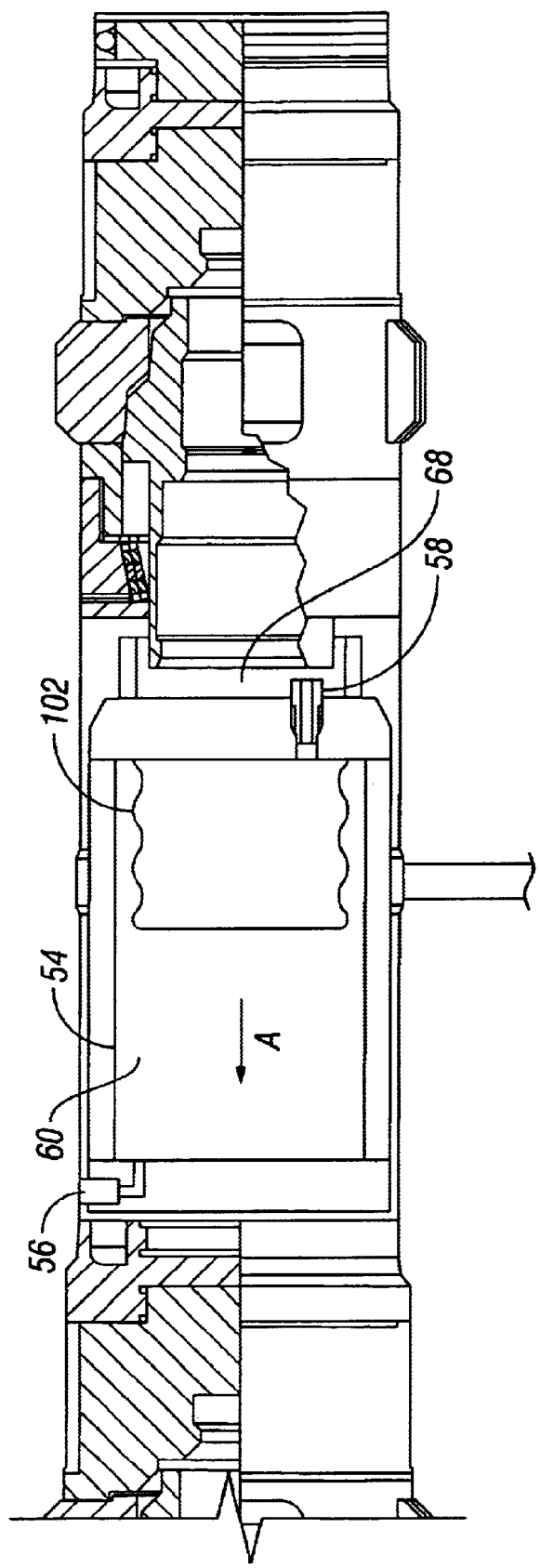
FIG. 6 shows a side view of the invention with bellows.

FIG. 6 shows the embodiment of the invention with bellows 102. When the rupture disk 58 activates, such as by breaking, the incompressible fluid 68 flows into the bellows 102 causing the bellows to expand in the direction designated 'A' in the figure. The charging fitting 56 is used to pressurize the compressible material 60 within the chamber 54 before the device is located within the subsea Christmas tree. This charging fitting is optional, as the housing can be non-pressurized.

Figure 7:
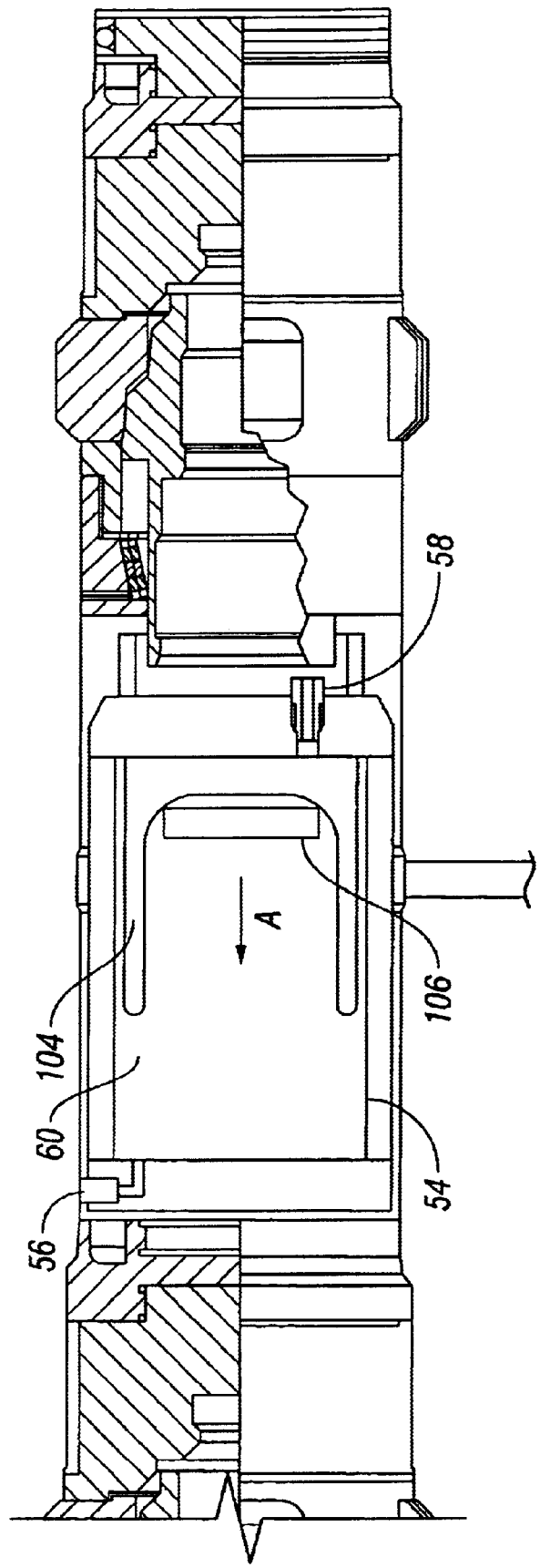
FIG. 7 shows a side view of the invention with a bladder.

FIG. 7 shows the embodiment of the invention with a bladder 104. This embodiment optionally include a support piston 106 which floats adjacent the bladder in the chamber 54. When the rupture disk 58 activates, such as by breaking, the incompressible fluid 68 flows into the bellows 104 causing the bellows and pushing the support piston 106 in the direction designated 'A' in the figure. The volume available to the incompressible fluid 68, therefore, expands. The charging fitting 56 is used to pressurize the compressible material 60 within the chamber 54 before the device is located within the subsea Christmas tree. This charging fitting is optional, as the housing can be non-pressurized.

An embodiment of the invention can have the chamber acting as an accumulator with the support piston 106.

Figure 8:
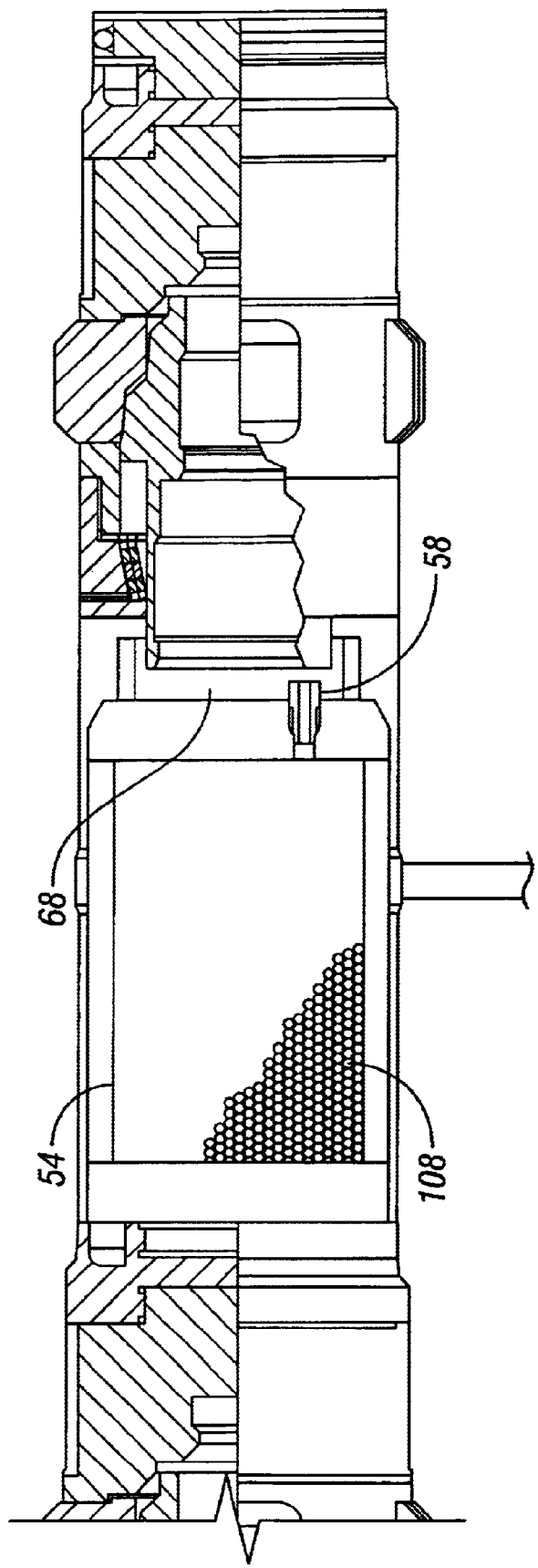
FIG. 8 shows a side view of the invention with an accumulator.

FIG. 8 shows a side view of an embodiment of the invention wherein the inert gas is replaced with a small open celled foam 108. The chamber 54 can be partially or entirely filled with foam 108. The foam 108 can be any material that will compress to between 50% and 75% of its original volume when pressure is applied. For example, the foam 108 can be polyurethane or any other similar type of open cell foam.

Figure 9:
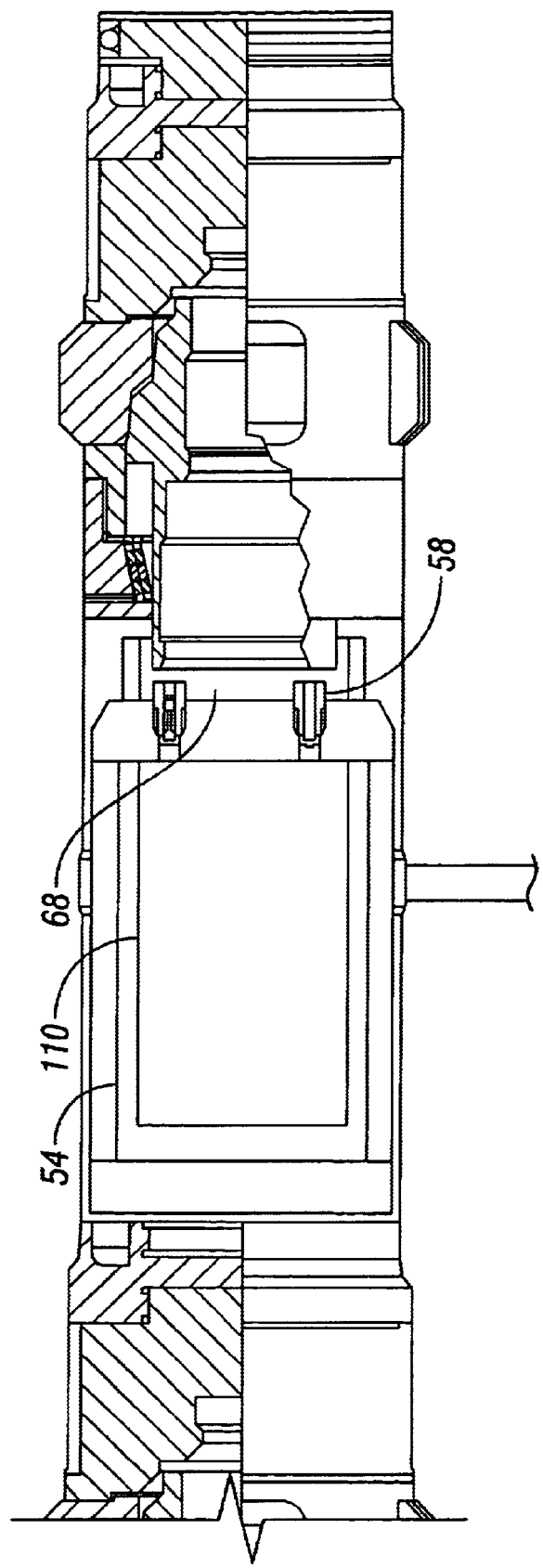
FIG. 9 shows a side view of the invention with a foam filled chamber.

FIG. 9 shows a side view of an embodiment of the invention. In this FIG. 9, a container 110 disposed within the trapped volume space. This container contains the compressible material and can be either pressurized or non-pressurized depending on the amount of pressure the container must accommodate to operate as a safety device. The container is adapted to implode or possibly burst when the pressure differential is achieved enabling the commingling of the incompressible fluid, such as a hydrostatic fluid like water.

While this invention has been described with emphasis on the preferred embodiments, it should be understood that within the scope of the appended claims, the invention might be practiced other than as specifically described herein.

What is claimed is:

1. A safety device for a trapped volume space for use as overpressure protection, comprising:
   a. a housing forming a chamber, and wherein the housing is located within a trapped volume space comprising a incompressible fluid;
   b. a compressible material disposed in the chamber;
   c. a pressure relief component in communication with the compressible material and the incompressible fluid, wherein the pressure relief component is adapted to break at a predetermined point thereby increasing the trapped volume space by compressing the compressible material and resulting in a reduced pressure in the trapped volume space.

2. The device of claim 1, wherein the pressure relief component is an imploding container or a rupture disk and is disposed in communication with the housing.

3. The device of claim 2, wherein the imploding container is a ceramic, a porcelain, a glass, a metal, an elastomer, a rubber, a synthetic rubber, a polymer, a copolymer thereof, a laminate thereof, a composite thereof, or a combination thereof.

4. The device of claim 2, wherein the rupture disk is adapted to commingle the compressible material with the incompressible fluid.

5. The device of claim 2, wherein the imploding container is adapted to commingle the compressible material with the incompressible fluid.

6. The device of claim 1, wherein the pressure relief component is an irreversible use component.

7. The device of claim 1, wherein the predetermined point is a set pressure limit for the trapped volume space.

8. The device of claim 1, further comprising a charging fitting located in the housing to pressurize the compressible material in the chamber.

9. The device of claim 1, wherein the compressible material is an inert gas or a foam.

10. The device of claim 1, further comprising a member of the group comprising a bellows, a bladder and combinations thereof disposed in the chamber.

11. The device of claim 1, wherein the trapped volume space is in a space within a subsea Christmas tree, wherein the space is selected from the group consisting of a production annulus, a casing annulus, an isolation sleeve area, a locking area, an unlocking area, a secondary unlocking area, at least one of the gallery areas, a tubing hanger unlock area, a tubing plug, and a cap, and other spaces within the Christmas tree system and combinations thereof.

12. The device of claim 1, wherein the housing is comprised of a rigid material adapted to withstand a incompressible fluid pressure equivalent to at least 10 feet of water depth.

13. The device of claim 1, further comprising a charging fitting is a valve.

14. The device of claim 1, wherein the compressible material is an inert gas selected from the group consisting of nitrogen, air, helium, and combinations thereof.

15. A pressure relief device for a subsea Christmas tree, comprising:
   a. a housing forming a chamber, and wherein the housing is located within a trapped volume space in the subsea Christmas tree comprising an incompressible fluid;
   b. a compressible material disposed in the chamber;
   c. a pressure relief component in communication with the compressible material and the incompressible fluid, wherein the pressure relief component is adapted to break at a predetermined point thereby increasing the trapped volume space by compressing the compressible material and resulting in a reduced pressure in the trapped volume space.

16. The device of claim 15, wherein the pressure relief component is an imploding container or a rupture disk and is in communication with the housing.

17. The device of claim 16, wherein the imploding container is a ceramic, a porcelain, a glass, a metal, an elastomer, a rubber, a synthetic rubber, a polymer, a copolymer thereof, a laminate thereof, a composite thereof, or a combination thereof.

18. The device of claim 16, wherein the rupture disk is adapted to commingle the compressible material with the incompressible fluid.

19. The device of claim 16, wherein the imploding container is adapted to commingle the compressible material with the incompressible fluid.

20. The device of claim 15, wherein the pressure relief component is an irreversible use component.

21. The device of claim 15, wherein the predetermined point is a set pressure limit for the trapped volume space.

22. The device of claim 15, further comprising a charging fitting located in the housing to pressurize the compressible material in the chamber.

23. The device of claim 15, wherein the compressible material is an inert gas or a foam.

24. The device of claim 15, further comprising a member of the group comprising a bellows, a bladder and combinations thereof disposed in the chamber.

25. The device of claim 16, wherein the trapped volume space in the subsea Christmas tree is a space is selected from the group consisting of a production annulus, a casing annulus, an isolation sleeve area, a locking area, an unlocking area, a secondary unlocking area, at least one of the gallery areas, a tubing hanger unlock area, a tubing plug, a cap, and other spaces within the Christmas tree system and combinations thereof.

26. The device of claim 15, wherein the housing is comprised of a rigid material adapted to withstand an incompressible fluid pressure equivalent to at least 10 feet of water depth.

27. The device of claim 15, further comprising a charging fitting which is a valve.

28. The device of claim 16, wherein the compressible material is an inert gas selected from the group consisting of nitrogen, air, helium, and combinations thereof.

29. A method for preventing overpressure situations in a trapped volume space, comprising
   a. disposing an apparatus in a trapped volume space for use as overpressure protection, wherein the apparatus comprises:
      i. a housing forming a chamber, and wherein the housing is located within a trapped volume space comprising a incompressible fluid;
      ii. a compressible material disposed in the chamber; and
      iii. a pressure relief component in communication with the compressible material and the incompressible fluid;
   b. engaging the pressure relief component when the pressure of the incompressible fluid reaches a set pressure limit; and
   c. increasing the trapped volume space by compressing the compressible material and resulting in a reduced pressure in the trapped volume space by permitting the incompressible fluid to commingle with the compressible material.

30. The method of claim 29, further comprising the step of using a charging fitting on the housing to pressure the compressible material.

31. The method of claim 29, further comprising using a rupture disc or an imploding container as the pressure relief component and wherein the pressure relief component is disposed in communication with the housing.

32. The method of claim 29, wherein an inert gas or a foam is used as the compressible material in the chamber.

33. The method of claim 29, wherein the trapped volume space is a subsea Christmas tree.

34. A system for preventing overpressure situations in a trapped volume space, comprising
   a. a subsea Christmas tree;
   b. a trapped volume space containing a incompressible fluid located within the subsea Christmas tree;
   c. a pressure relief device disposed within the trapped volume space, comprising:
      i. a housing forming a chamber;
      ii. a compressible material disposed in the chamber;
      iii. a pressure relief component in communication with the compressible material and the incompressible fluid, wherein the pressure relief component is adapted to break at a predetermined point thereby increasing the trapped volume space by compressing the compressible material and resulting in a reduced pressure in the trapped volume space.

* * * * *